Nov. 13, 1928.
E. J. HALL
PISTON RING
Filed Sept. 22, 1925  2 Sheets-Sheet 1
1,691,518
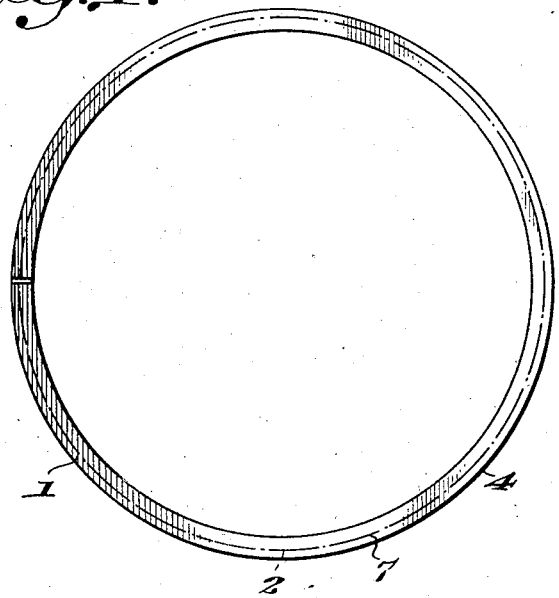
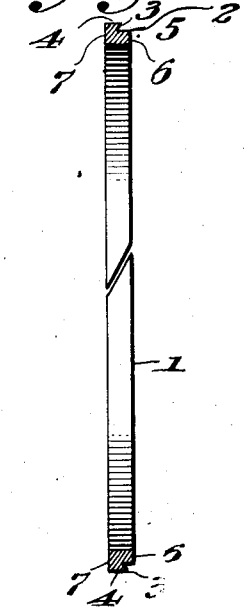
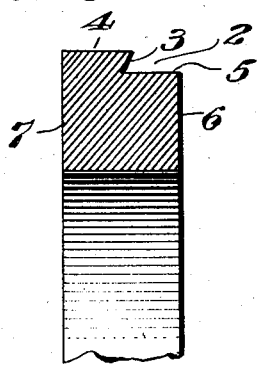
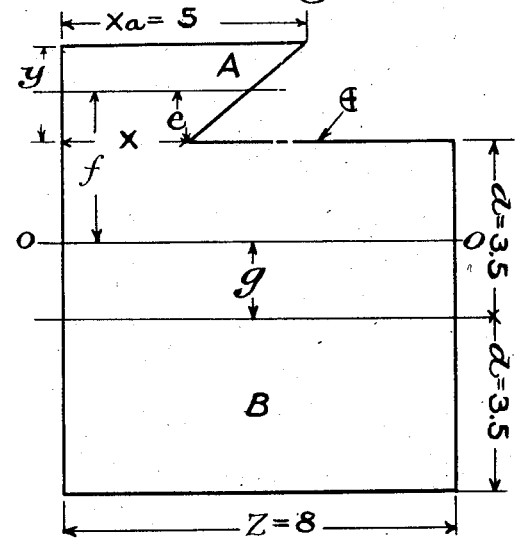
Inventor,
Elbert J. Hall
By Dewey, Strong, Townsend & Softus
Attys Nov. 13, 1928.

E. J. HALL

PISTON RING

Filed Sept. 22, 1925

Inventor;
Elbert J. Hall
By Dewey, Strong, Townsend & Loftus
Attys

Patented Nov. 13, 1928.

1,691,518

UNITED STATES PATENT OFFICE.

ELBERT J. HALL, OF BERKELEY, CALIFORNIA.

PISTON RING.

Application filed September 22, 1925. Serial No. 57,932.

This invention relates to improvements in piston rings.

The object of the present invention is to reduce cylinder wear to a minimum in machinery of any type using a piston.

Most piston rings are over-tensioned when new, so as to have sufficient tension when worn to provide an effective packing, and this over-tensioning of piston rings causes undue wear of the cylinder walls.

The primary object of the present invention is to produce a one-piece piston ring which will obviate the necessity of over-tensioning piston rings, by maintaining throughout the entire life of a piston ring a predetermined pressure per unit of area of its cylindrical bearing face, so that only the proper and desired amount of tension is necessary in a new ring, and no undue wear will be caused by the ring when new.

A further object of the invention is to provide a piston ring in which the area of its cylinder wall contacting surface will decrease with the wear of the ring, thereby causing a reduction in tension, so as to maintain a constant predetermined relation between the said cylinder wall contacting surface and the tension of the ring, thereby enabling the desired proper amount of pressure to be maintained at all times by the piston ring against the wall of the cylinder.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction, within the scope of the claims, may be resorted to without departing from the spirit or sacrificing any of the advantages of the invention.

In the drawings:

Figure 1 is a side elevation of a piston ring constructed in accordance with this invention.

Figure 2 is a transverse sectional view of the same.

Fig. 3 is an enlarged cross section of the ring.

Fig. 4 is a diagram illustrating the problem of ascertaining the angle or inclination for producing a variable bearing surface adapted to be reduced in area with the wear of the piston ring.

Figure 5:
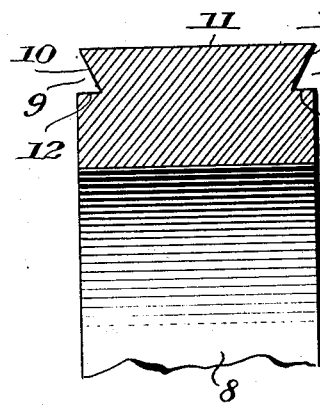
Fig. 5 is a cross section of a piston ring provided at each side of its cylinder wall engaging or bearing surface with an inclined face.

Referring particularly to Figs. 1 to 4 inclusive of the drawings, 1 designates a piston ring designed to take the place of the ordinary piston ring and provided at one side with a circumferential recess 2 having an inclined side wall 3 forming an undercut at the circumference of the piston ring and extending inwardly from the cylinder wall engaging surface 4 at the outer face of the ring and providing an inward taper in the ring adapted to compensate for the wear of the piston ring. As the piston ring becomes worn and reduced in diametrical thickness the outer cylinder wall engaging surface is reduced in area to compensate for the wear of the piston ring and the corresponding reduction in the ring tension. The angle of the undercut is such as to maintain approximately constant the pressure per unit area exerted by the piston ring on the cylinder wall throughout the life of the ring. By this construction as the tension of the ring decreases through wear the area of the cylinder wall engaging surface of the ring is correspondingly reduced so as to maintain constantly a predetermined relation between the outer cylinder wall engaging surface of the ring and the tension thereof. This will enable piston rings to be constructed without over tensioning the same and the piston rings may be given a predetermined tension which will remain substantially constant throughout the life of the ring so that the piston ring will be effective as a packing at all times without undue wear on the cylinder wall.

The problem of finding the angle of the undercut in a wear compensated piston ring such that as the ring is worn down the pressure per unit area exerted by the ring on the cylinder wall will remain approximately constant is worked out with reference to the form of the invention illustrated in Figs. 1 to 3 inclusive of the drawings and particularly with relation to the diagrammatic illustration shown in Fig. 4 but the same formula as will be readily understood is applicable to the other forms of the invention illustrated in the drawings and hereinafter described in detail. As this may be determined mathematically, it is deemed sufficient to explain the formula only in connection with one form of the invention, viz, that illustrated in Figs. 1 to 3 inclusive of the drawings.

The problem will be solved by designing the ring so that when the ring has been worn down a given amount the pressure per unit area will be the same as it was when the ring was first installed. Figure 4 shows a section of a wear compensated ring on which all of the dimensions are known except $(x)$. The problem will be to find a value of $x$ such that when the ring is worn down so that $(y)$ is practically nothing the pressure per unit area exerted by the ring will be the same as it is with the section indicated. In Figure 4 the dimensions are in 64ths.

On page 126 of "The Gasoline Automobile" by Heldt is given the equation for a ring which is circular when normal and is of rectangular section.

$$S = \frac{Et(r_1 - r)}{2rr_1 - t(r_1 + r)} \quad (1)$$

Where
  $S$ = The fiber stress in pounds per square inch,
  $E$ = The modulus of elasticity of the material,
  $r$ = The radius of the piston ring normal,
  $r_1$ = The radius of the ring in the cylinder and
  $t$ = The thickness of the ring radially.

Since $t(r_1 + r)$ is small compared with $r_1 r_2$ a change in it may be considered negligible. Also the change in the value of $r$ due to the wearing down of the ring will be small compared with $r$. Taking these things into consideration it will be found that no serious error will be introduced if Equation (1) be written, $$S = \frac{Nt(r_1 - r)}{r} \quad (2)$$

Where $N$ is a constant.
On page 130 of Heldt is given the equation, $$p = \frac{St^2}{3b^2 \sin^2(\tfrac{1}{2}\theta)} \quad (3)$$

Where
  $p$ = pounds per square inch radial pressure exerted by a rectangular ring.
  $b$ = the cylinder bore,
  $\theta$ = the angular distance of the point in question to the gap of the ring.

Substituting $S$ in Equation (2) in Equation (3) and multiplying and dividing by the width $W_1$ of the ring gives, $$p = \frac{N(r_1 - r)wt^3}{3wrb^2 \sin^2(\tfrac{1}{2}\phi)} \quad (4)$$

For a rectangle $wt^3 = 12\ I$ (see a handbook) $\quad (5)$

Where $I$ is the moment of inertia of the section about an axis through the center of gravity of the section and parallel to the axis of the ring.

Substituting (5) in (4) gives, $$p = \frac{4N(r_1 - r)I}{wrb^2 \sin^2(\tfrac{1}{2}\phi)} \quad (6)$$

For a given position on the ring $\phi$ is constant. Consequently, $$\frac{4N}{b^2 \sin^2(\tfrac{1}{2}\phi)} = K \quad (7)$$

Where $K$ is a constant. Substituting (7) in (6) gives, $$p = \frac{KI(r_1 - r)}{xr} \quad (8)$$

Where $x$ equals $w$, the width of the ring in contact with the cylinder.

Let $I_a$, and $x_a$ refer to the section of the ring and $r_a$ to its normal radius when it is new and let $I_b$, and $r_b$ refer to the same after the ring has worn down so that $y$ is practically zero. Then according to the original proposition, $$P_a = P_b$$

$$\frac{KI_a(r_1 - r_a)}{x_a r_a} = \frac{KI_b(r_1 - r_b)}{x_b r_b}$$

Transposing and cancelling $K$, and calling $I_a$, $I$ and $x_b$, $x$, $$Ix = \frac{I_b x_a (r_1 - r_b) r_a}{(r_1 - r_a) r_b} \quad (9)$$

$I_b = .666zd^3$ (see a handbook) $= .666(8)(3.5)^3 = 229$
$x_a$ = a constant = 5
$r_1 = 2.112(64)$ (an arbitrary constant)
$r_a = 2.194(64)$ (an arbitrary constant)
$r_b = 2.162(64)$ (an arbitrary constant)
Substituting these values in the equation gives:

$$Ix = \frac{229(5)(2.112(64) - 2.162(64)(2.194))(64)}{(2.112(64) - 2.194(64))(2.162)(64)}$$

$$Ix = 707 \quad (10)$$

Now, $I$ must be expressed in terms of $x$.

Consider the section (Figure 4) to be divided into two areas A and B. For the whole section I refers to the center of gravity axis moment of inertia. The line $oo$ is through the center of gravity of the whole section.

$$I = I_A + I_B \tag{11}$$

Where $I_A$ and $I_B$ are the moments of inertia of the areas A and B respectively about the axis $oo$.

$$I_B = I_B' + g^2 B \text{ and } I_A = I_A' + f^2 A \text{ (see a hand book)} \tag{12}$$

Where $I_B'$ and $I_A'$ refer to the moment of inertia about the center of gravity of B and A respectively. Substituting (12) in (11) gives:

$$I = I_A' + f^2 A + I_B' + g^2 B \tag{13}$$

$$I_A' = \frac{Y^3(x_a^2 + 4xx_a + x^2)}{36(x + x_a)} \text{ (See a handbook)} \tag{14}$$

$x_a = 5$ and $Y = 2$ (an arbitrary constant)
Hence, $$I_A' = \frac{2(25 + 20x + x^2)}{9(5+x)} \tag{15}$$

$$I_B' = 229 \tag{16}$$

$$f = \frac{(d+e)B}{A+B} \text{ (See a handbook)} \tag{17}$$

$$A = \tfrac{1}{2} Y(x_a + x) = 5 + x \text{ (See a handbook)} \tag{18}$$

$$e = \frac{Y(2x_a + x)}{3(x_a + x)} = \frac{2(10+x)}{3(5+x)} \text{ (See a handbook)} \tag{19}$$

$$B = 2dz = 56 \tag{20}$$
$$g = e + d - f \tag{21}$$
$$d = 3.5 \tag{22}$$

Combining Equations (13) to (21) inclusive gives the value of 1 in terms of $x$ which when substituted in Equation 10 gives:

$$\left(\frac{2x(25+20x+x^2)}{9(5+x)}\right) + (229x) + \left[3146x(5+x)\left(\frac{3.5 + \frac{2(10+x)}{3(5+x)}}{61+x}\right)^2\right] +$$

$$\left(\left[3.5 + \frac{2(10+x)}{3(5+x)} - 56\left(\frac{3.5 + \frac{2(10+x)}{3(5+x)}}{61+x}\right)\right]^2 56x\right) - 707 = 0 = f(x) \tag{23}$$

Since this is a biquadratic equation it can be solved by formulas but the method would be extremely cumbersome. Instead $x$ was given trial values until one was found which would satisfy the equation. The value $x = 1.95$ was found to satisfy the equation. Hence $x = 1.95$ 64ths of an inch,
$x = .0304$ inches.

The bottom wall 5 of the groove 2 is in parallelism with the inner and outer faces of the ring and the side faces 6 and 7 of the piston ring are parallel and present flat abutments to the walls of the piston grooves so that ring groove wear is reduced to a minimum.

In Fig. 5 of the drawing is illustrated another form of the invention in which the piston ring 8 is provided at both sides with circumferental grooves 9 each having an inclined wall 10 extending inwardly from the outer cylinder wall engaging surfaces 11 and the inclined walls 10 form undercuts which produce an inwardly tapered outer portion in the ring adapted to compensate for the wear of the ring and maintain approximately constant the pressure per unit of area exerted by the piston ring on the cylinder wall during the life of the ring.

The bottom walls 12 of the side circumferential grooves 9 are in parallelism with the inner and outer faces of the piston ring and the side faces of the piston ring are parallel.

Figure 6:
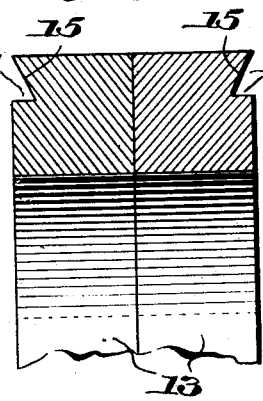
Fig. 6 is a similar view illustrating another form of the invention and showing a piston ring composed of two ring sections each provided at its outer side with an inclined face.

In Fig. 6 of the drawing is illustrated a form of the invention in which the piston ring is composed of two ring sections 13 each provided at its outer side with a circumferential groove 14 having an inclined side wall 15 forming an undercut similar to the inclined walls of the rings heretofore described. The bottom walls of the grooves 14 are in parallelism with the inner and outer faces of the piston ring sections and the side faces of the section are parallel, the inner side faces abutting and extending from the inner face of the ring to the outer face thereof. The abutting relation of the ring sections throughout their entire inner side faces produces a composite ring of approximately the construction of the single piece ring illustrated in Fig. 5 of the drawings.

Figure 7:
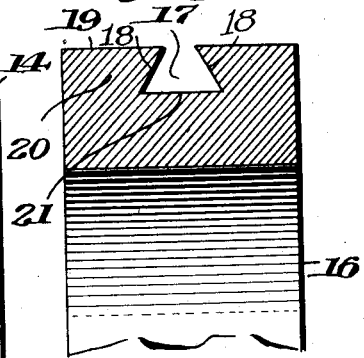
Fig. 7 is a cross section of a piston ring provided centrally of its cylinder wall engaging face with an annular groove having inclined side walls or faces.

In Fig. 7 of the drawings is illustrated a piston ring 16 provided with a central circumferential groove 17 having inclined side walls 18 forming undercuts and extending inwardly from the outer surfaces 19 of the side portions 20 of the ring 16. These side portions are tapered inwardly and compensate for the wear of the piston ring and the ring presents parallel side faces to the walls of the ring groove of the piston. The bottom wall 21 of the central circumferential groove 17 is in parallelism or concentric with the inner and outer faces of the ring.

Figure 8:
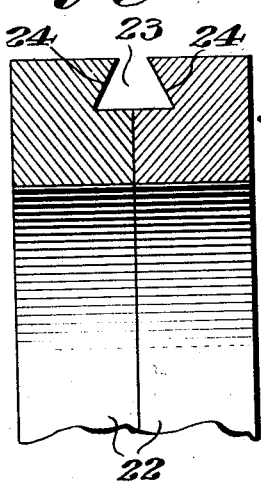
Fig. 8 is a cross sectional view showing a similar construction composed of two ring sections.

In Fig. 8 of the drawings is illustrated a sectional piston ring composed of two sections 22 formed by dividing the ring centrally of the groove 23. The side walls 24 of the groove 23 are inclined and extend inwardly from the outer surfaces of the ring sections and produce tapered portions in the said ring sections to compensate for the wear of the piston ring. The outer side faces of the sections are parallel and extend from the inner to the outer face of the piston ring and present flat surfaces to the walls of the ring grooves of a piston.

Figure 9:
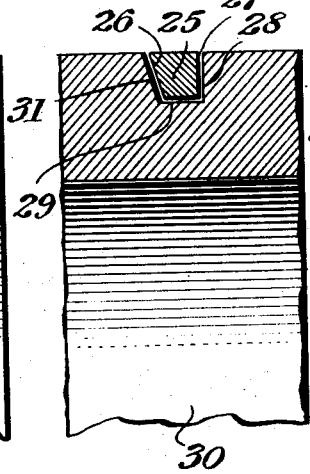
Fig. 9 is a sectional view or portion of a piston provided with a piston ring showing another form of the invention having inclined faces extending the entire thickness of the piston ring.

In Fig. 9 of the drawings is illustrated a piston ring 25 having an inclined side face 26 extending inwardly from the outer face of the ring to the inner face thereof. The other side face 27 of the piston ring is perpendicular to the axis of the piston and presents a flat surface to the wall 28 of the ring groove 29 of the piston 30. The other wall 31 of the ring groove of the piston is inclined in substantially parallelism with the inclined side face 26 of the piston ring 25.

Figure 10:
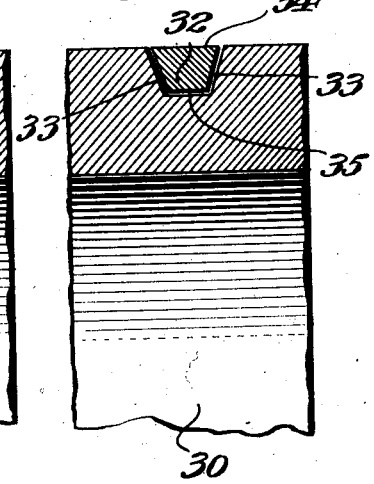
Fig. 10 is a similar view showing a piston ring having an inclined face at each side extending the entire thickness of the ring.

In Fig. 10 of the drawing is illustrated a piston ring 32 having both of its side faces 33 inclined to provide a double undercut to the ring. The inclined side faces extend inwardly from the outer face 34 of the ring 32 to the inner face 35 thereof. In both the rings 25 and 32 a continuous taper is formed in the ring from the outer face to the inner face thereof. Also the angle or curve of the undercut may be plotted to take care of wear on the cylinder walls so that the taper of the ring will be such that both the wear of the compression ring and the wear of the cylinder walls will be compensated for.

What is claimed is:

1. A wear compensated piston ring having an outer cylinder wall engaging surface, an undercut therefrom to provide an inward taper adapted as the ring wears in thickness to simultaneously reduce the area of the cylinder wall engaging surface, the angle of the undercut being such as to maintain approximately constant the pressure per unit area exerted by the ring on the cylinder wall throughout the life of the ring.

2. A wear compensated piston ring having an outer cylinder wall engaging surface, and provided thereat with a circumferential groove forming an undercut and having an inclined side wall, said inclined wall forming an inward taper in the ring from the cylinder wall engaging surface and the angle of the wall being such as to maintain approximately constant the pressure per unit area exerted by the ring on the cylinder wall throughout the life of the ring.

3. A wear compensated piston ring provided in its outer face with a circumferential groove having inclined side walls extending inwardly from the outer surface of the piston ring and forming undercuts, the side walls of the groove being inclined and the angle of the side walls of the said groove being such as to maintain constant, approximately, the pressure per unit area exerted by the ring on the cylinder wall throughout the life of the ring.

4. A wear compensated piston ring provided in its outer face with a circumferential groove having inclined side walls extending inwardly from the outer surface of the piston ring and forming undercuts, the side walls of the groove being inclined and the angle of the side walls of the said groove being such as to maintain approximately constant the pressure per unit area exerted by the ring on the cylinder wall throughout the life of the ring, said piston ring being divided centrally of the groove to form two ring sections having abutting inner side faces and presenting outer side faces in parallelism from the inner face of the ring to the outer face thereof.

5. A compression ring for cylinders having means for compensating for wear and thereby maintaining an approximately constant uniform ring tension per unit of area of the cylinder wall engaging surface of the compression ring throughout the life of the ring.

6. A compensating ring for cylinders having a tapered portion undercut at an angle, the angle of the undercut being such as to proportionately reduce the axial width of the tapered portion simultaneously with the diametrical reduction in thickness through wear of the ring of the said tapered portion to maintain approximately contant the ring tension throughout the life of the compression ring.

7. The method of maintaining approximately uniform ring tension per unit of area of the cylinder wall engaging surface of compression rings consisting in undercutting the ring to produce an inward taper and proportionately reducing the axial width of the tapered portion simultaneously with the reduction by wear in the diametrical thickness of the said tapered portion.

ELBERT J. HALL.